Sept. 30, 1930   Z. H. WILLIAMS   1,777,189
STEERING DEVICE
Filed July 9, 1928
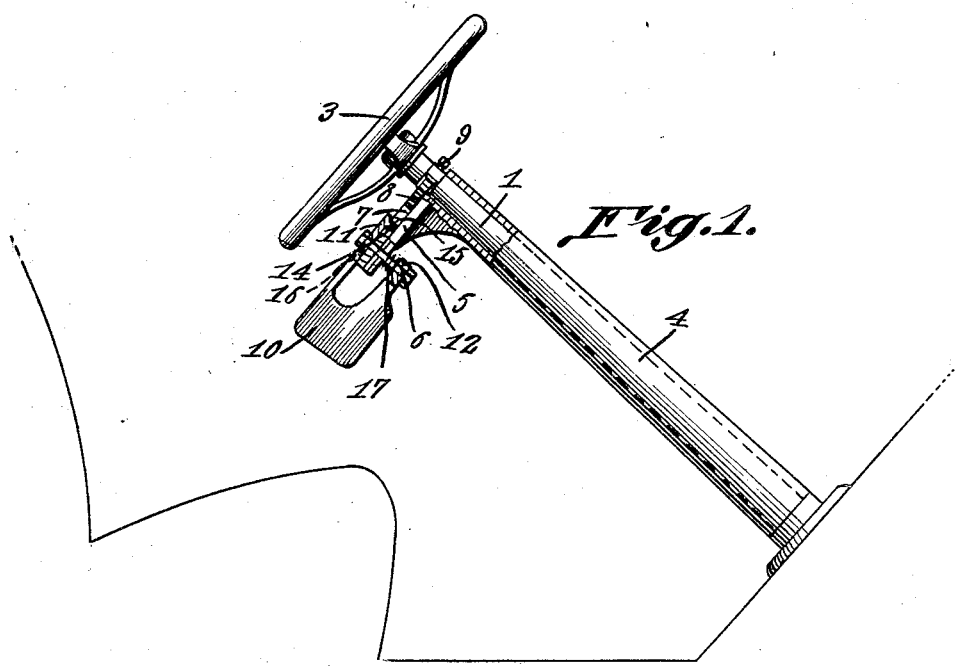
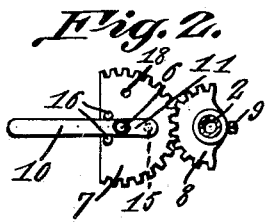
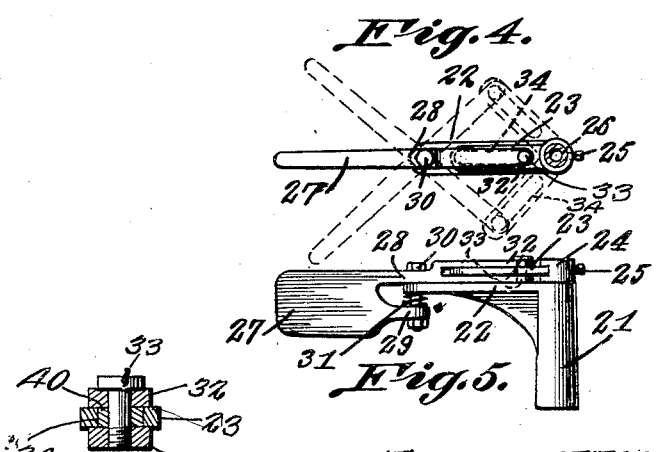
Zenas H. Williams, Inventor
By C. A. Snow & Co.
Attorneys Patented Sept. 30, 1930

1,777,189

UNITED STATES PATENT OFFICE

ZENAS H. WILLIAMS, OF SAN ANTONIO, TEXAS

STEERING DEVICE

Application filed July 9, 1928. Serial No. 291,278.

This invention aims to provide a simple means whereby the driver of a motor propelled vehicle may control the steering wheel with his knees, from a sitting posture, thereby leaving the hands free for operations other than steering.

It is within the province of the disclosure to improve generally and enhance the utility of devices of that type to which the invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the accompanying drawings:—

Figure 1 shows in side elevation, a device constructed in accordance with the invention, some parts being in section;

Figure 2 is a plan showing the gears;

Figure 3 is a plan showing a modified operating member;

Figure 4 is a plan showing a modification;

Figure 5 is an elevation of the structure shown in Figure 4;

Figure 6 is a cross section showing sundry parts used in the form disclosed in Figures 4 and 5.

Referring to Figures 1 and 2, the numeral 1 designates the steering wheel column of a motor propelled vehicle, the steering shaft 2 being journaled in the column 1. The steering wheel which controls the shaft 2 is marked by the numeral 3. A support for certain portions of the operating mechanism is provided. The support may be in the form of a sleeve 4, placed about the column 1 and secured thereon.

The sleeve 4, in Figure 1, has been shown as of approximately the same length as the column 1, but the sleeve may be of any desired length, for instance, of the length shown in Figure 5 of the drawings, although that figure relates to a modification. On the upper end of the sleeve 4, there is a rearwardly projecting bracket 5, disposed approximately at right angles to the axis of the steering shaft, and the steering column 1.

A securing element 6, which may be a bolt, is mounted in the bracket 5. On the securing element 6, a gear 7 is mounted to rotate, the gear being disposed above the bracket 5 and being supported thereby. The gear 7 meshes with a pinion 8, of smaller diameter than the gear 7, the pinion 8 being secured at 9, by a set screw, or otherwise, to the steering shaft 2.

The numeral 10 designates a knee lever, in the form of a plate, having an upper arm 11 and a lower arm 12, the lower arm being a trifle shorter than the upper arm. The upper arm 11 of the knee lever 10 rests on top of the gear 7 and has a rectangularly disposed projection 14 engaged in a seat 15 formed in the gear 7. The upper arm 11 of the lever 10 extends between two fingers or pins 16 which project upwardly from the gear 7. The securing element 6 passes through the arm 11 of the knee lever 10 at a point between the pins 16, on the one hand, and the projection 14, on the other hand.

Since the upper arm 11 of the knee lever 10 is connected with the gear 7 by the securing element 6, the pins 16, and the projection 14, a very secure attachment is afforded. The lower arm 12 of the knee lever 10 extends beneath the bracket 5 and is spaced therefrom. A coiled spring 17 is mounted on the securing element 6 between the arm 12 and the lower surface of the bracket 5. The operator can take his hands off the steering wheel 3 and engage the lever 10 between his knees.

The lever 10, being knee-operated, swings on the securing element 6 and causes the gear 7 to turn on the securing element, rotation being imparted to the pinion 8 and to the shaft 2, to bring about the steering operation which, formerly, was accomplished by means of the wheel 3.

In the event that the operator wishes to have the knee lever 10 out of the way, he can shove the knee lever upwardly, the spring 17 being compressed, the projection 14 on the arm 11 of the knee lever 10 being detached from the seat 15 in the gear 7, and the arm 11 of the lever 10 being raised above and clear of the pins 16. The operator then can turn the lever 10 around on the securing element 6 until the projection 14 on the lever is received in the seat 18 which is formed in the gear 7, the spring 17 reacting to hold down the arm 11 of the lever on the upper surface of the gear 7, with the projection 14 engaged in the seat 18, as aforesaid.

In Figure 3, the knee lever is marked by the numeral 19 and has a fork 20 at its rear end, the construction being such that the device may be operated by a one-legged man, or by a person who wishes to use one leg only in the steering operation.

Referring to Figures 4, 5 and 6, there is shown a sleeve 21, having the function of the sleeve 4 of Figure 1. The sleeve 21 carries a bracket 22. An arm 23 is connected by a collar 24, and set screw 25, or otherwise, to the steering wheel shaft 25. The knee lever appears at 27 and has an upper arm 28 and a lower arm 29. Through these arms 28 and 29, passes the securing element 30 which forms a fulcrum for the lever 27. A coiled spring 31 is mounted on the securing element 30 and is located between the bracket 22 and the lower arm 29. The upper arm 28 has spaced fingers 32 between which the part 23 extends. The fingers 32 carry a projection 33, such as a bolt or screw. A roller 40 is journaled on the part 33 and is mounted to slide in an elongated slot 34 formed in the arm 33 of the steering wheel shaft 26.

The lever 27 may be swung sidewise, and tilting movement will be imparted to the arm 23, the shaft being rotated accordingly.

What is claimed is:—

1. In a device of the class described, a sleeve so shaped that it can be placed on a steering wheel column, there being a rearwardly extended bracket on the sleeve and disposed approximately at right angles to the sleeve, a lever in the form of a substantially vertical plate of sufficient area to be engaged between the knees of an operator, the lever having an upper arm and a lower arm, the lower arm being shorter than the upper arm, the upper arm being disposed above the bracket, and the lower arm being disposed below the bracket, a securing element whereon the lever swings, the securing element being mounted in the bracket, in the end of the short lower arm, and in the intermediate portion of the long upper arm, a compression spring disposed about the securing element and bearing against the bracket and against the lower arm of the lever, a collar at the upper end of the sleeve and shaped for mounting on a steering shaft, and interengaging elements on the collar and on the upper arm of the lever, whereby the collar will be rotated when the lever is swung on the securing element.

2. In a device of the class described, a sleeve so shaped that it can be placed on a steering wheel column, there being a rearwardly extended bracket on the sleeve and disposed approximately at right angles to the sleeve, a lever having an upper arm and a lower arm, the lower arm being shorter than the upper arm, the upper arm being disposed above the bracket, and the lower arm being disposed below the bracket, a securing element whereon the lever swings, the securing element being mounted in the bracket, in the end of the short lower arm, and in the intermediate portion of the long upper arm, a compression spring disposed about the securing element and bearing against the lower arm of the lever, a member constructed for mounting on a steering wheel shaft, and interengaging elements on said member and on the upper arm of the lever, whereby the said member will be rotated when the lever is swung on the securing element.

3. In a device of the class described, a bracket and means for mounting the bracket on a steering wheel column, a lever having an upper arm and a lower arm, the lower arm being disposed below the bracket, and the upper arm being disposed above the bracket, a securing element whereon the lever swings, the securing element being mounted in the bracket and in both arms of the lever, a compression spring disposed about the securing element and bearing against the bracket and against the lower arm of the lever, a member constructed for mounting on a steering wheel shaft, and interengaging elements on said member and on the upper arm of the lever, whereby the said member will be rotated when the lever is swung on the securing element.

4. In a device of the class described, a bracket and means for mounting the bracket on a steering wheel column, a lever having an upper arm and a lower arm, the bracket extending between the arms, a securing element whereon the lever swings, the securing element being mounted in the bracket and in both arms of the lever, a compression spring disposed about the securing element and bearing against the bracket and one of the arms of the lever, a member constructed for mounting on a steering wheel shaft, and interengaging elements on said member and on one of the arms of the lever, whereby the said member will be rotated when the lever is swung on the securing element.

5. In a device of the class described, a support, a securing element mounted on the support, a gear mounted to turn on the securing element and having circumferentially spaced seats, a lever mounted on the securing element and having a projection receivable in either of the seats, for adjustment, to vary the position of the lever with respect to the gear, a pinion wherewith the gear meshes, means for mounting the pinion for turning movement with a steering shaft, and means for mounting the support in fixed relation to a steering shaft.

6. In a device of the class described, a support, a securing element mounted on the support, a gear mounted to turn on the securing element, the gear having upstanding members and being provided with circumferentially spaced seats, a lever mounted on the securing element, the lever having a projection engaged in one of the seats, and the lever extending between said upstanding members when the lever is in working position, the securing element being so constructed that it can be loosened, thereby to permit the lever to be disengaged from between said upstanding members and to permit the projection to be engaged in the other of the seats, when the lever is in inoperative position, a pinion wherewith the gear meshes, means for mounting the pinion for turning movement with a steering shaft, and means for mounting the support in fixed relation to a steering shaft.

In testimony that I claim the foregoing as my own, I have hereto affixed my signature.

ZENAS H. WILLIAMS.